United States Patent
Chu et al.

(10) Patent No.: US 11,641,426 B2
(45) Date of Patent: May 2, 2023

(54) USB PHONE SUPPORTING MULTI-DEVICE CONFERENCE APPLICATION AND CONTROL METHOD THEREOF

(71) Applicant: YEALINK (XIAMEN) NETWORK TECHNOLOGY CO., LTD., Fujian (CN)

(72) Inventors: Yingkun Chu, Fujian (CN); Yun Liao, Fujian (CN)

(73) Assignee: YEALINK (XIAMEN) NETWORK TECHNOLOGY CO., LTD., Xiamen (CN)

(*) Notice: Subject to any disclaimer, the term of this patent is extended or adjusted under 35 U.S.C. 154(b) by 139 days.

(21) Appl. No.: 17/172,025

(22) Filed: Feb. 9, 2021

(65) Prior Publication Data

US 2021/0266408 A1 Aug. 26, 2021

(30) Foreign Application Priority Data

Feb. 25, 2020 (CN) .......................... 202010115321.1

(51) Int. Cl.
*H04M 3/56* (2006.01)
*H04W 4/80* (2018.01)

(52) U.S. Cl.
CPC ........... *H04M 3/567* (2013.01); *H04M 3/568* (2013.01); *H04W 4/80* (2018.02); *H04M 2250/08* (2013.01)

(58) Field of Classification Search
None
See application file for complete search history.

(56) References Cited

U.S. PATENT DOCUMENTS

| 2007/0165754 A1* | 7/2007 | Kiukkonen | H04L 1/0015 375/346 |
| 2008/0032629 A1* | 2/2008 | Wang | H04M 1/72412 455/41.2 |
| 2010/0158288 A1* | 6/2010 | Winter | H04R 5/04 381/311 |
| 2018/0046429 A1* | 2/2018 | Jensen | G06F 13/426 |

FOREIGN PATENT DOCUMENTS

CN 204216969 U 3/2015

* cited by examiner

*Primary Examiner* — Hemant S Patel

(57) ABSTRACT

A USB phone supporting multi-device conference application includes: a touch display module, an audio processing module, a digital enhanced cordless telecommunications (DECT) module, a Bluetooth module, a USB interface, and an MCU controller. The Bluetooth module is configured to establish a Bluetooth communication connection with an external Bluetooth terminal; the USB interface is configured to establish a USB communication connection with an external intelligent terminal; the DECT module is configured to establish a communication connection with an external wireless headphone; the touch display module is configured to display data, and recognize and obtain a touch operation instruction; the audio processing module is configured to perform audio processing on received audio data; the MCU controller is configured to process received data, further provided with a first mixer and connected to the touch display module, the audio processing module, the DECT module, the Bluetooth module, and the USB interface.

8 Claims, 4 Drawing Sheets

USB PHONE SUPPORTING MULTI-DEVICE CONFERENCE APPLICATION AND CONTROL METHOD THEREOF

CROSS-REFERENCE TO RELATED APPLICATIONS

The present application claims the benefit of Chinese Patent Application No. 202010115321.1 filed on Feb. 25, 2020, the contents of which are hereby incorporated by reference.

TECHNICAL FIELD

The present disclosure relates to the technical field of instant messaging, and in particular, to a Universal Serial Bus (USB) phone supporting a multi-device conference application and a control method thereof.

BACKGROUND

In recent years, with the popularity of Unified Communication (UC) communication software, more and more enterprises choose instant messaging software for internal and external communication. Such software is generally installed on a Personal Computer (PC) or a mobile phone, so that the enterprise does not need to buy a separate Internet Protocol (IP) phone, thus reducing costs. Meanwhile, because such instant messaging software is simple and easy to use, the enterprise does not need to arrange special Information Technology (IT) practitioners for deployment and maintenance. However, such software needs to share audio input and output with a computer or a mobile phone, and the sound quality cannot compare with that of a dedicated phone. In addition, if the instant messaging software is installed on a computer, a user needs to wear a headphone for a long time or stare at the computer monitor, to avoid missing important calls. This causes inconvenience and great constraint. Therefore, external USB phones become the choice of most enterprises. On the one hand, the USB phones are plug-and-play. A user only needs to connect a USB port of the USB phone to a computer without any additional deployment work, which is convenient. On the other hand, the USB phones are less expensive than traditional IP phones, while the sound quality is comparable to that of the IP phones, which can effectively reduce the investment of enterprises.

Currently, most of the USB phones on the market only support multi-device connection, for example, the USB phone can be connected to a desk phone, a PC and a mobile device at the same time, and can also be connected to multiple headphones at the same time, allowing multiple parties to participate in a conference locally. However, such a traditional USB phone only supports multi-device connection. In the case of a multi-party conference, only incoming calls from the same device can access the conference, while calls from multiple devices cannot be mixed.

SUMMARY

The present disclosure provides a USB phone supporting a multi-device conference application and a control method thereof, where a mixer is disposed to mix audio of multiple calls, so as to implement a multi-device mixed conference; and multiple wireless headphones can be connected to participate in the conference, thereby improving the scalability of the USB phone.

To resolve the above problem, embodiments of the present disclosure provide a USB phone supporting a multi-device conference application, including: a touch display module, an audio processing module, a DECT module, a Bluetooth module, a USB interface, and a Micro Controller Unit (MCU) controller, wherein the Bluetooth module is configured to establish a Bluetooth communication connection with an external Bluetooth terminal through a Bluetooth protocol; the USB interface is configured to establish a USB communication connection with an external intelligent terminal; the DECT module is configured to establish a communication connection with an external wireless headphone through a DECT protocol; and the touch display module is configured to display data on a display screen, and recognize and obtain a touch operation instruction on the display screen; the audio processing module is configured to perform audio processing on received audio data; the MCU controller is configured to process received data; the MCU controller is further provided with a first mixer, and the first mixer is configured to mix the audio data received by the MCU controller; the MCU controller is connected to the touch display module, the audio processing module, the DECT module, the Bluetooth module, and the USB interface.

Preferably, the USB interface includes a first USB interface and a second USB interface.

Preferably, the DECT module establishes communication connections with multiple external wireless headphones through the DECT protocol.

Preferably, the DECT module is further provided with a second mixer, and the second mixer is configured to mix multiple channels of audio data sent by the multiple wireless headphones and received by the DECT module.

The embodiments of the present disclosure further provide a control method supporting a multi-device conference application, for controlling the above USB phone supporting a multi-device conference application, the method including the following steps:

establishing a first call with the external Bluetooth terminal through the Bluetooth module, obtaining a first channel of audio data, and transmitting the first channel of audio data to the MCU controller;

establishing a second call with the external intelligent terminal through the first USB interface, obtaining a second channel of audio data, and transmitting the second channel of audio data to the MCU controller;

establishing a third call with the external intelligent terminal through the second USB interface, obtaining a third channel of audio data, and transmitting the third channel of audio data to the MCU controller; and mixing, by the first mixer, the multiple channels of audio data received by the MCU controller, to obtain mixed output audio, and outputting the mixed output audio.

Preferably, the control method supporting a multi-device conference application further includes: establishing a fourth call with an external wireless headphone through the DECT module, obtaining a fourth channel of audio data, and transmitting the fourth channel of audio data to the MCU controller.

Preferably, when the DECT module establishes multiple calls with multiple wireless headphones, multiple channels of headphone audio data transmitted by the multiple wireless headphones are obtained, the multiple channels of headphone audio data are mixed by the second mixer to obtain the fourth channel of audio data, and the fourth channel of audio data is transmitted to the MCU controller.

Preferably, the Bluetooth terminal includes a mobile phone terminal or a tablet computer containing a Bluetooth communication module; and the intelligent terminal includes a PC terminal or an IP phone terminal.

Compared with the prior art, embodiments of the present disclosure have the following beneficial effects:

1. In the present disclosure, multiple devices can be connected through Bluetooth and USB at the same time, and by setting a mixer to mix audio of multiple calls, calls of the multiple devices can be combined to implement a multi-device mixed conference.

2. Multiple DECT wireless headphones can be connected through a DECT module, to support a multi-headphone conference application.

DETAILED DESCRIPTION

Figure 1:
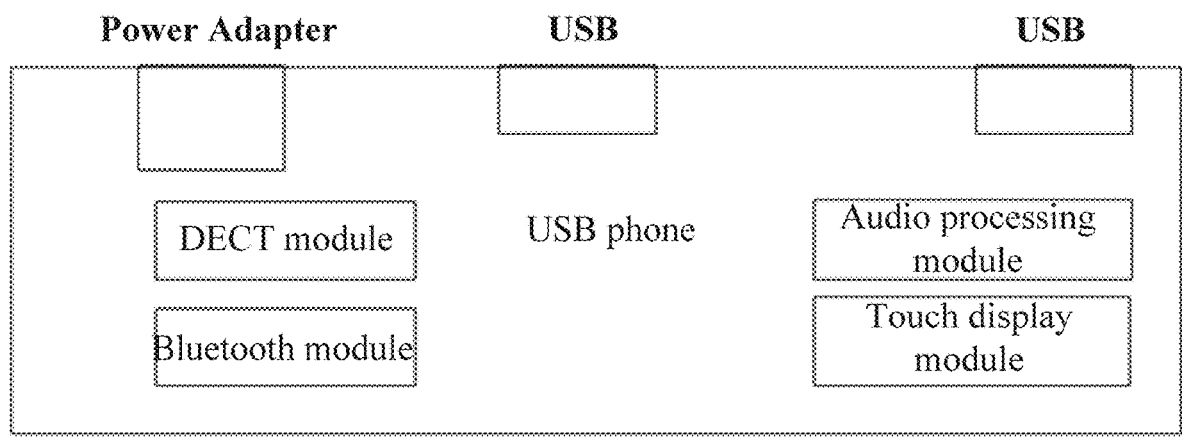
FIG. 1 is a schematic structural diagram of a USB phone supporting a multi-device conference application according to an embodiment of the present disclosure.
Figure 2:
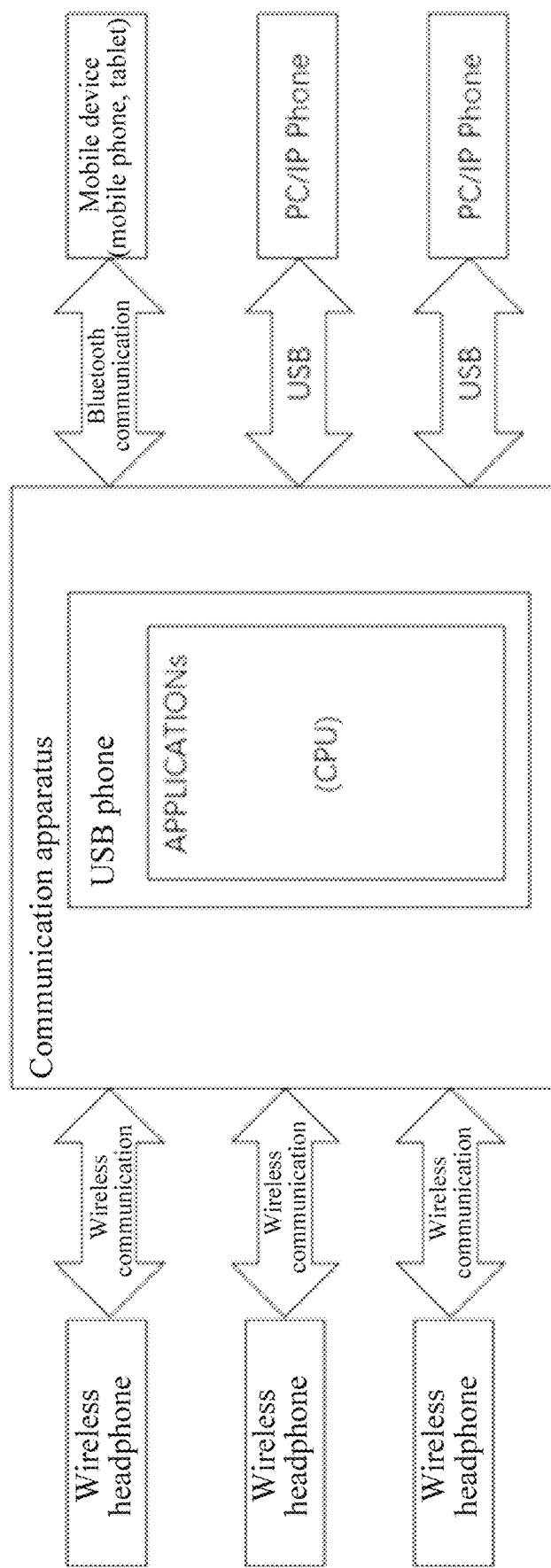
FIG. 2 is a schematic diagram of extension of a USB phone supporting a multi-device conference application according to an embodiment of the present disclosure.

The technical solutions of the embodiments of the present disclosure are clearly and completely described below with reference to the accompanying drawings. Apparently, the described embodiments are only some of, rather than all of the embodiments of the present disclosure. All other embodiments obtained by a person of ordinary skill in the art based on the embodiments of the present disclosure without creative efforts shall fall within the protection scope of the present disclosure.

Referring to FIG. 1 to FIG. 4, a preferred embodiment of the present disclosure provides a USB phone supporting a multi-device conference application, including: a touch display module, an audio processing module, a DECT module, a Bluetooth module, a USB interface, and an MCU controller.

The Bluetooth module is configured to establish a Bluetooth communication connection with an external Bluetooth terminal through a Bluetooth protocol; the USB interface is configured to establish a USB communication connection with an external intelligent terminal; the DECT module is configured to establish a communication connection with an external wireless headphone through a DECT protocol; in this embodiment, the USB interface includes a first USB interface and a second USB interface.

The touch display module is configured to display data on a display screen, and recognize and obtain a touch operation instruction on the display screen; the audio processing module is configured to perform audio processing on received audio data; the MCU controller is configured to process received data; the MCU controller is further provided with a first mixer, and the first mixer is configured to mix the audio data received by the MCU controller; the MCU controller is connected to the touch display module, the audio processing module, the DECT module, the Bluetooth module, and the USB interface.

The USB telephone may be connected to multiple devices simultaneously. The USB telephone may be connected to mobile devices such as a mobile phone and a tablet through Bluetooth pairing, and connected to a PC and an IP phone through a USB, and voice can be switched directly between the paired device and USB phone.

The present disclosure provides a USB phone supporting a multi-device conference application, where a touch display module, an audio processing module, a DECT module, a Bluetooth module, and a USB interface are built in the USB phone. The USB phone can be connected to mobile devices (including mobile phones and tablets, etc.), PCs, and IP phones, and also supports local DECT extension to connect multiple wireless headphones. That is, the USB phone supports a three-device mixed conference mode and multi-headphone conference application. In addition, because the USB phone has a built-in touch display module, phone and call operations can be directly performed through the touch display screen. The USB phone is plug-and-play, while requiring no additional installation procedures and zero maintenance costs.

In another embodiment, the DECT module establishes communication connections with multiple external wireless headphones through the DECT protocol. In this embodiment, the DECT module is further provided with a second mixer, and the second mixer is configured to mix multiple channels of audio data sent by the multiple wireless headphones and received by the DECT module.

The USB phone may be connected to multiple DECT wireless headphones through extension. In this case, due to the built-in DECT module, the USB phone acts as a DECT base station. The wireless headphones pair with the USB phone through DECT wireless communication, and register information thereof with the USB phone. In a local conference, a voice stream is shared between the wireless headphones and the USB phone. The USB phone acts as an organizer of the conference and can perform call control operations on the paired wireless headphones, for example, muting or removing an attendee. The paired wireless headphones are attendees who can only control their own audio through the headphones and cannot control the audio of the organizer or the whole conference.

An implementation principle of mixing of the USB telephone supporting a multi-device conference application in this technical solution is described in detail as follows:

1. A mobile phone/tablet transmits BT audio to the MCU of the USB phone through the Bluetooth module.

2. The USB phone is connected to a PC or an IP phone through a USB port on the MCU or a DECT IC, to transmit USB audio.

3. If the USB audio is transmitted through the USB port on the DECT IC, the USB audio needs to be transmitted to the MCU via a TDM.

4. The mixer on the MCU mixes the received USB audio and BT audio.

5. If an external DECT wireless headphone needs to be connected, the USB phone and the DECT wireless headphone are paired and connected through the DECT protocol first; if multiple DECT headphones are connected, the mixer in the DECT module performs mixing processing first. The mixed audio is then transmitted to the DECT IC through a DECT signal. The DECT IC receives the DECT signal and converts the DECT signal into DECT audio, and finally transmits the DECT audio to the MCU via the TDM.

6. The mixer on MCU mixes the received DECT audio, USB audio and BT audio.

Figure 3:
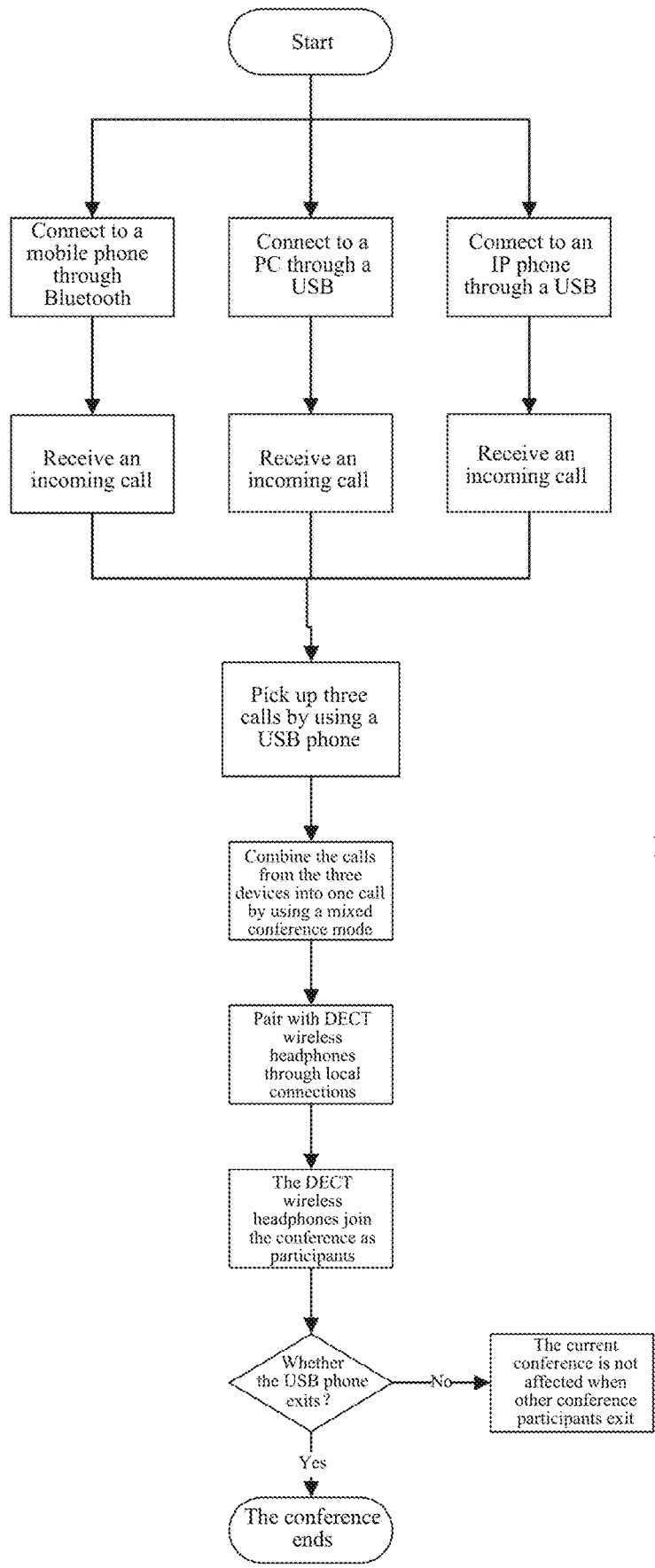
FIG. 3 is a flowchart of a control method supporting a multi-device conference application according to an embodiment of the present disclosure.
Figure 4:
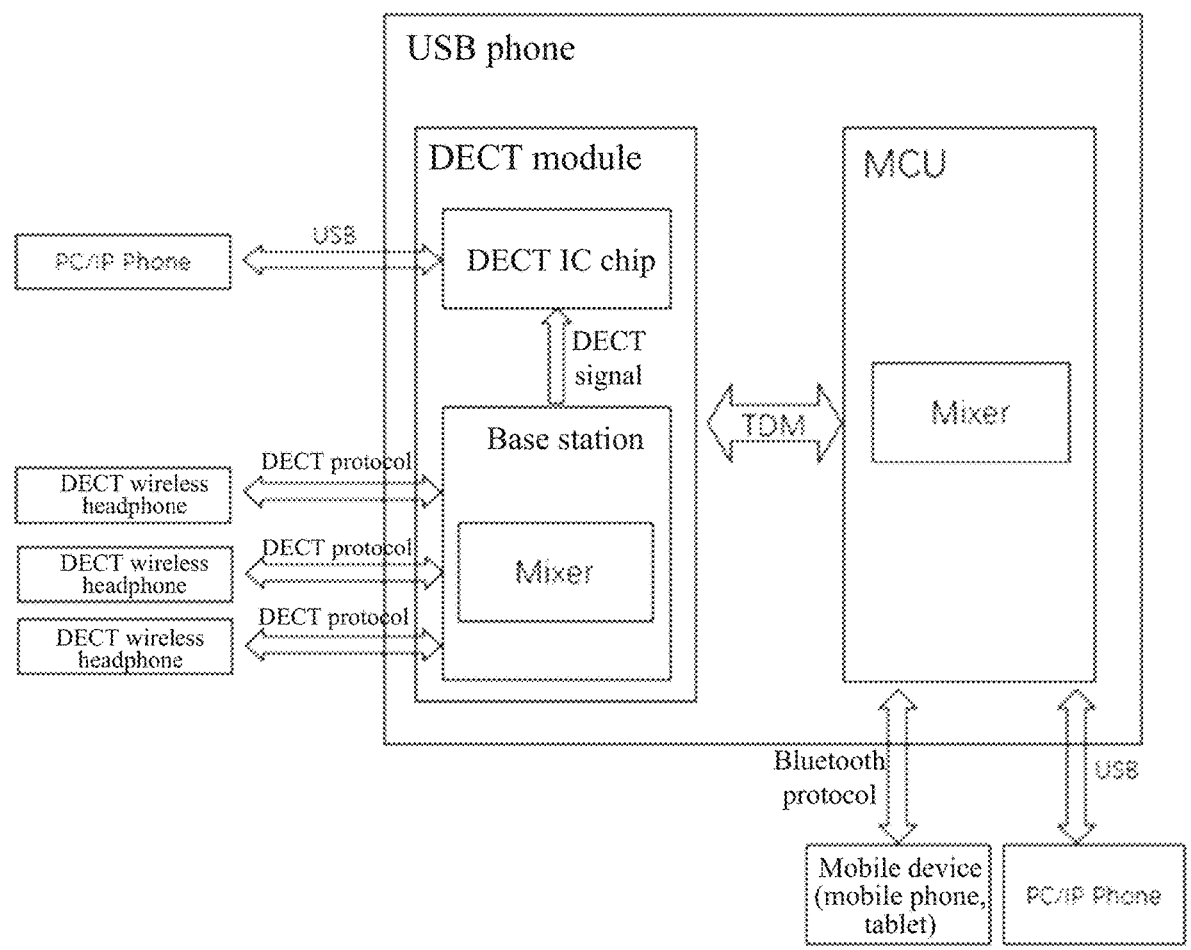
FIG. 4 is a diagram of a technical principle of a USB phone supporting a multi-device conference application according to an embodiment of the present disclosure.

Referring to FIG. 3, an embodiment of the present disclosure further provides a control method supporting a multi-device conference application, for controlling the foregoing USB phone supporting a multi-device conference application. The method includes the following steps:

S1: establish a first call with the external Bluetooth terminal through the Bluetooth module, obtain a first channel of audio data, and transmit the first channel of audio data to the MCU controller.

S2: establish a second call with the external intelligent terminal through the first USB interface, obtain a second channel of audio data, and transmit the second channel of audio data to the MCU controller.

S3: establish a third call with the external intelligent terminal through the second USB interface, obtain a third channel of audio data, and transmit the third channel of audio data to the MCU controller.

S4: mix, by the first mixer, the multiple channels of audio data received by the MCU controller, to obtain mixed output audio, and output the mixed output audio.

Specifically: 1. the USB phone is connected to the phone by Bluetooth. 2. The USB phone is connected to the PC by the USB. 3. The USB phone is connected to the IP phone by the USB. 4. The mobile phone, a soft client on the PC, and the IP phone each receive a call. 5. The three calls are picked up by the USB phone, the call picked up first will be held, and the last call picked up is a currently active call. 6. The three calls are combined into one call by a physical button on the headphone or a touch key on the touch screen, to enter a mixed conference mode. 7. The USB phone is the organizer of the conference and can control the calls of the current conference. If the USB phone exits from the conference, the conference will be canceled automatically. 8. The rest are the participants of the conference, who can adjust their own call audio, such as the volume or whether to mute. If a participant exits from the conference, the current conference continues without being affected.

It should be noted that, in the description of the specification, the description made with reference to the term "one embodiment", "some embodiments", "an example", "a specific example", "some examples" or the like means that a specific feature, structure, material or characteristic described in combination with the embodiment(s) or example(s) are included in at least one embodiment or example of the present disclosure. Moreover, the particular features, structures, materials or characteristics described may be combined in any suitable manner in any one or more embodiments or examples. In addition, those skilled in the art may combine different embodiments or examples described in the specification or features in different embodiments or examples without any contradiction.

Moreover, the terms such as "first" and "second" are used only for the purpose of description and cannot be understood as indicating or implying relative importance or implicitly indicating the number of technical features denoted. Therefore, features defined by "first" and "second" may explicitly or implicitly include at least one of the features. In the description of the present disclosure, "a plurality of" means two or more, unless otherwise specifically defined. It should be noted that the first call, second call and third call mentioned above are merely used for distinguishing among calls and are not intended to limit the sequence of establishing the calls. That is, the second call or the third call may be established first, and the sequence of establishing the calls may be changed at will according to actual needs.

In another embodiment, the control method supporting a multi-device conference application further includes: establishing a fourth call with an external wireless headphone through the DECT module, obtaining a fourth channel of audio data, and transmitting the fourth channel of audio data to the MCU controller. In this embodiment, when the DECT module establishes multiple calls with multiple wireless headphones, multiple channels of headphone audio data transmitted by the multiple wireless headphones are obtained, the multiple channels of headphone audio data are mixed by the second mixer to obtain the fourth channel of audio data, and the fourth channel of audio data is transmitted to the MCU controller.

Specifically, locally extended connections may be established, and multiple DECT wireless headphones are connected through DECT communication, thereby increasing the number of local conference participants.

It should be noted that in the above embodiment, the Bluetooth terminal includes a mobile phone terminal or a tablet computer containing a Bluetooth communication module; the intelligent terminal includes a PC terminal or an IP phone terminal.

The technical solution of the present disclosure has the following advantages:

1. The USB phone can be connected to multiple devices via Bluetooth and the USB at the same time, and can combine calls of three devices (one Bluetooth device and two USB devices) by a mixed conference mode, to enter a conference mode. During the call, conference control operations can be performed on the current conference by the USB phone, and the participants can control their own audio.

2. The USB phone supports multi-headphone conference applications, and can connect multiple DECT wireless headphones through DECT. In this case, the USB phone is equivalent to a base station, in-house wireless communication can be performed in a certain DECT coverage area. Definitely, the USB phone can also be connected to a Bluetooth wireless headphone via Bluetooth.

3. The USB phone is plug-and-play, and only needs to be connected to a responsive calling device without requiring any additional installation program or application program.

In another preferred embodiment, the USB phone supporting a multi-device conference application provided in the foregoing embodiment includes: a touch display module, an audio processing module, a DECT module, a Bluetooth module, a USB interface and an MCU controller; the MCU controller may be a controller or a chip; the touch display module, the audio processing module, the DECT module and the Bluetooth module may be independent controllers or chips respectively, or may be integrated on a chip; the MCU controller is connected to the touch display module, the audio processing module, the DECT module, the Bluetooth module and the USB interface.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. It should be particularly noted that, any modifications, equivalent substitutions, improvements, and the like made by those skilled in the art within the spirit and scope of the present disclosure should be included within the protection scope of the present disclosure.

The invention claimed is:

1. A Universal Serial Bus (USB) phone supporting a multi-device conference application, comprising: a touch display module, an audio processing module, a Digital Enhanced Cordless Telecommunications (DECT) module, a Bluetooth module, a USB interface, and a Micro Controller Unit (MCU) controller, wherein the Bluetooth module is configured to establish a Bluetooth communication connection with an external Bluetooth terminal through a Bluetooth protocol; the USB interface is configured to establish a USB communication connection with an external intelligent terminal; the DECT module is configured to establish a communication connection with an external wireless headphone through a DECT protocol; and the touch display module is configured to display data on a display screen, and recognize and obtain a touch operation instruction on the display screen; the audio processing module is configured to perform audio processing on received audio data; the MCU controller is configured to process received data; the MCU controller is further provided with a first mixer, and the first mixer is configured to mix audio data received by the MCU controller; the MCU controller is connected to the touch display module, the audio processing module, the DECT module, the Bluetooth module, and the USB interface.

2. The USB phone supporting a multi-device conference application according to claim 1, wherein the USB interface comprises a first USB interface and a second USB interface.

3. The USB phone supporting a multi-device conference application according to claim 2, wherein the DECT module establishes communication connections with multiple external wireless headphones through the DECT protocol.

4. The USB phone supporting a multi-device conference application according to claim 3, wherein the DECT module is further provided with a second mixer, and the second mixer is configured to mix multiple channels of audio data sent by the multiple wireless headphones and received by the DECT module.

5. A control method supporting a multi-device conference application, for controlling the USB phone supporting a multi-device conference application according to claim 4, the method comprising the following steps:

establishing a first call with the external Bluetooth terminal through the Bluetooth module, obtaining a first channel of audio data, and transmitting the first channel of audio data to the MCU controller;

establishing a second call with the external intelligent terminal through the first USB interface, obtaining a second channel of audio data, and transmitting the second channel of audio data to the MCU controller;

establishing a third call with the external intelligent terminal through the second USB interface, obtaining a third channel of audio data, and transmitting the third channel of audio data to the MCU controller; and mixing, by the first mixer, the multiple channels of audio data received by the MCU controller, to obtain mixed output audio, and outputting the mixed output audio.

6. The control method supporting a multi-device conference application according to claim 5, further comprising: establishing a fourth call with an external wireless headphone through the DECT module, obtaining a fourth channel of audio data, and transmitting the fourth channel of audio data to the MCU controller.

7. The control method supporting a multi-device conference application according to claim 6, wherein when the DECT module establishes multiple calls with multiple wireless headphones, multiple channels of headphone audio data transmitted by the multiple wireless headphones are obtained, the multiple channels of headphone audio data are mixed by the second mixer to obtain the fourth channel of audio data, and the fourth channel of audio data is transmitted to the MCU controller.

8. The control method supporting a multi-device conference application according to claim 5, wherein the Bluetooth terminal comprises a mobile phone terminal or a tablet computer containing a Bluetooth communication module; and the intelligent terminal comprises a Personal Computer (PC) terminal or an Internet Protocol (IP) phone terminal.

\* \* \* \* \*